Aug. 1, 1933.  E. STICH  1,920,719
AERATING DEVICE
Filed Jan. 9, 1932
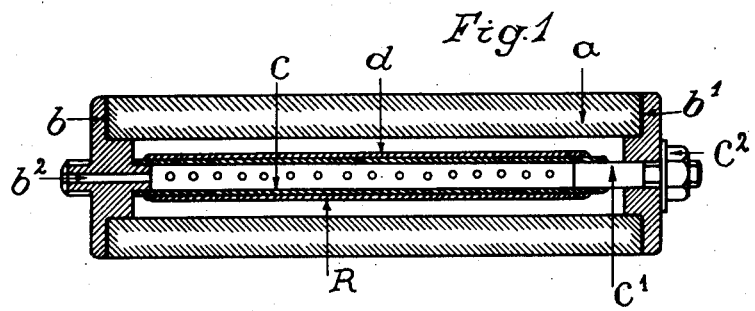
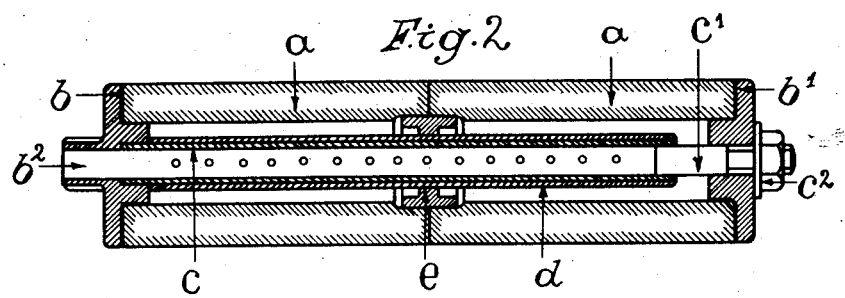
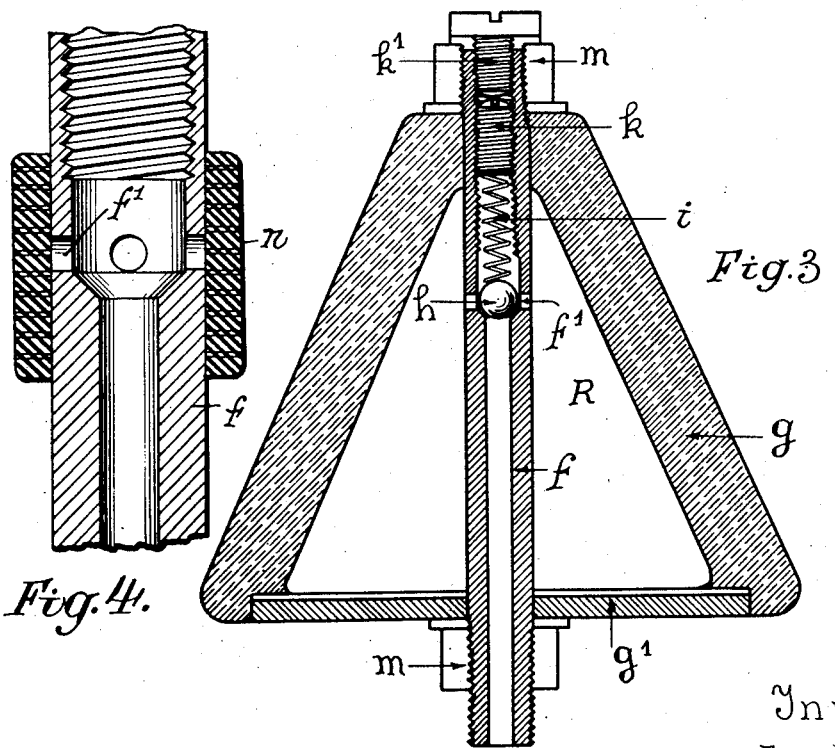
Inventor
Eugen Stich
By D^r Berg
Attorney Patented Aug. 1, 1933

1,920,719

UNITED STATES PATENT OFFICE 1,920,719

AERATING DEVICE

Eugen Stich, Mannheim, Germany

Application January 9, 1932, Serial No. 585,742, and in Germany January 15, 1931

4 Claims. (Cl. 261—121)

This invention relates to improvements in aerating heads or caps as used for aerating or gasifying liquids and more particularly to such aerators as employ porous bodies to the interior of which the air or gas is supplied under pressure and through the porous walls of which the gas percolates into the fluid. Such aerators are employed in large numbers in brewing and like vats and vessels. They are generally formed cylindrical and are closed at one end and supplied with gas or air from a common pipe or other source. If one such aerator breaks, the liquid can pass into all the other aerators of the system which are connected to the same supply. As these aerators are closed at one end, it becomes difficult to clean them after such soiling by breakage of a single aerator.

The object of the present invention is to avoid this difficulty and this is effected by providing means whereby the gas or air pressure within the aerator is maintained and the reverse percolation of liquid through the aerator instead of air through the porous walls thereof is avoided. The invention is more particularly described in suitable examples illustrated in the accompanying drawing and the novel features thereof are pointed out in the appended claims. In the drawing:—

Figure 1 is a longitudinal section through an aerator in accordance with this invention.

Figure 2 is a similar view of a slightly modified form.

Figure 3 shows a form of the invention in longitudinal section also, in which a ball or like non-return valve is employed instead of the rubber non-return valve or pierced tube used in the forms shown in Figs. 1 and 2.

Fig. 4 is a modified form of the non-return valve in a longitudinal section.

The porous aerator body proper is shown in Figure 1 as composed of a tube $a$ open at both ends which are closed by means of the cover plates $b$ and $b^1$. Within the porous body made of burned clay or the like there is a gas supply pipe $c$ which is perforated, in the form shown in Figure 1, along its whole length. A member having a non-return valve action is employed to control the air or gas flow through the perforations of the gas supply pipe in such a manner that when the gas pressure in the supply pipe falls the pressure in the space between the porous aerator body $a$ and the perforated pipe $c$ may be maintained and thus there is no tendency for the liquid in the vat or vessel where the aerator is employed to percolate through the porous body. In the form shown in Figure 1 the non-return valve member consists of a rubber tube $d$ extending over the perforated part of the supply pipe. The cover $b$ is fixed on the metal tube $c$ whilst the cover $b^1$ passes over a threaded stud $c^1$ fixed on the end of the perforated tube $c$. A nut $c^2$ when tightened holds both the covers $b$ and $b^1$ tightly against the porous aerator tube or body $a$. This body may be of cylindrical or any other desired form in cross section.

The rubber tube is perforated or pierced by means of a needle with a number of holes along its length. When gas under pressure is introduced into the pipe at $b^2$ the piercings in the rubber tube $d$ are opened and gas passes into the chamber R between the supply pipe $c$ and the aerator body $a$. As the porous body $a$ offers some considerable resistance to the passage of the gas through its walls, the pressure of the gas in the space R must be higher than the outside pressure of the liquid on the body $a$ before the gas can pass into the liquid. If, through any cause, the gas pressure in the supply falls, the piercings in the rubber tube are closed under the excess pressure in the space R and the pressure in this space is thus maintained and the liquid in the vat or the like cannot penetrate the walls of the porous body $a$. The cleansing of the bodies at any time when this is required is greatly facilitated by the arrangement of the two covers $b$ and $b^1$ which may be readily removed and access to the interior obtained. Any desired number of the bodies $a$ or complete aerator heads as shown in Figure 1 may be fixed by their threaded nipples $b^2$ to a common supply pipe for the gas under pressure.

In the form of the invention shown in Figure 2, there are two aerator bodies $a$ and $a$ which are held at their contiguous ends by a supporting ring $e$. Otherwise the aerator head shown in this figure is similar to that already described with reference to Figure 1.

In the form of the invention shown in Figure 3, the pierced rubber tube is dispensed with and its place is taken by a non-return valve. For this purpose the inner tube is not perforated along its whole length but only at the point where the non-return valve is arranged. The inner tube $f$ is in this form shown inside a conical aerator body $g$ and has perforations $f^1$ for communicating with the interior space R of the porous body $g$. This communication is located on the opposite side of the seating of a ball valve $h$ from the gas inlet end of the inner supply pipe $f$. A spring $i$ and adjusting screw $k$ retain the ball valve with the desired pressure against its seating. A threaded pin $k^1$ closes the end of the tube $f$ and the tube and porous body are held together by the nuts $m$. A base plate $g^1$ is employed to close the end of the conical body and this base plate is, as will be seen, held in place by the nut $m$.

The ball valve is employed in cases where the liquid in the vat or the gas employed renders the use of rubber inadvisable. In cases where rubber can be employed the ball valve $h$ may be replaced by a rubber ring $n$ which in this case may if desired be used without the piercings. This form of the non-return valve is illustrated by Fig. 4.

Having now particularly described and ascertained the nature of this invention and in what manner the same is to be performed, I declare that what I claim is:—

1. A porous aerating head adapted to be submerged in a liquid and having an outer hollow porous body made of burnt clay and the like, a perforated gas supply pipe within said body and a non-return valve member permitting passage of gas through said perforations in the gas pipe to the interior of the porous body but preventing the fall of pressure within said body when the gas pressure in the supply pipe fails.

2. A porous aerating head adapted to be submerged in a liquid and having an outer hollow porous body open at both ends and made of burnt clay and the like, a perforated gas supply pipe passing within said body and projecting through said open ends, a non-return valve member associated with said gas supply pipe and permitting only passage of gas to the interior of said porous body, closure members for the open ends of said porous body and a threaded member on the supply pipe for holding said closure members gas tight to the porous body.

3. A porous aerating head adapted to be submerged in a liquid and having an outer hollow porous body made of burnt clay and the like, a perforated gas supply pipe passing within said body and a rubber sleeve on the exterior of said supply pipe and over said perforations, said rubber sleeve being adapted to function as a non-return valve for gas from said pipe.

4. A porous aerating head adapted to be submerged in a liquid and having an outer hollow porous body made of burnt clay and the like, a perforated gas supply pipe passing within said body and an adjustable metal non-return valve permitting only passage of gas to the interior of said porous body and from said supply pipe.

EUGEN STICH.